United States Patent [19]
van Linden

[11] 4,176,213
[45] Nov. 27, 1979

[54] BATTERY UNIT, CONTAINING ONE OR MORE FUEL-CELL BLOCKS

[75] Inventor: Jacques van Linden, Stein, Netherlands

[73] Assignee: Electrochemische Energieconversie, N.V., Mol, Belgium

[21] Appl. No.: 920,541

[22] Filed: Jun. 29, 1978

[30] Foreign Application Priority Data

Jun. 29, 1977 [NL] Netherlands ............... 7707180

[51] Int. Cl.² ............................................. H01M 8/04
[52] U.S. Cl. .......................... 429/12; 429/14; 429/34
[58] Field of Search ................ 429/12, 14, 18, 34, 429/37, 38, 39, 72

[56] References Cited
U.S. PATENT DOCUMENTS

| | | |
|---|---|---|
| 3,099,587 | 7/1963 | Chambers et al. ............... 429/46 |
| 3,228,797 | 1/1966 | Brown et al. ............... 429/34 X |
| 3,331,706 | 7/1967 | Jenkins ............... 429/38 X |
| 3,378,404 | 4/1968 | Diotalevi et al. ............... 429/38 X |
| 3,573,104 | 3/1971 | Snyder, Jr. et al. ............... 429/37 |

Primary Examiner—Anthony Skapars
Attorney, Agent, or Firm—Cushman, Darby & Cushman

[57] ABSTRACT

Fuel-cell battery unit containing a number of fuel-cell blocks. The fuel-cell blocks are attached to a beam having an I-shaped cross-section, on both sides against the thin intermediate section thereof. Primary ducts for supplying air, fuel and electrolyte are provided either in the wide top and bottom parts of the beam, or separately alongside the beam. From these primary ducts secondary tubes are provided to supply or discharge air, fuel and electrolyte to or from the fuel-cell blocks.

A number of such units can be stacked to form a battery or battery section.

21 Claims, 4 Drawing Figures

BATTERY UNIT, CONTAINING ONE OR MORE FUEL-CELL BLOCKS

BACKGROUND OF THE INVENTION

1. General Nature of the Invention

This invention relates to fuel-cell batteries. More particularly, it relates to a battery unit containing a number of fuel-cell blocks, each of which comprises a number of fuel-cells. It also relates to fuel-cell batteries composed of such battery units and to a method for the electrochemical combustion of a fuel in such a battery unit.

2. Description of the Prior Art

A fuel-cell battery is, for practical reasons, frequently subdivided into a number of battery units containing a number of fuel-cell blocks each of which is provided with duct means for the supply and removal of fuel, oxidising agent and, if necessary, also electrolyte.

A plurality of such battery units with auxiliary equipment such as, for example, a pump together, form a fuel-cell battery.

In practice such batteries are frequently used for the electrochemical combustion of hydrogen with the aid of molecular oxygen present in the air. In this process it it possible to use an electrolyte in the form of a solution in water of, for example a base, e.g. KOH.

With such batteries a number of problems are encountered which have hitherto hampered their use on a large scale. A particular problem is presented by the exchangeability of the various component parts of the battery. It has to be possible to replace in a simple manner in situ both the individual battery units and the fuel-cell blocks, which together form the battery unit.

Owing to the pressure-build-up across the blocks it is necessary to take special constructional measures, often at the expence of exchangeability. In order to solve the problem of pressure-build-up in the cell it has previously been proposed to place a number of fuel-cells or fuel-cell blocks one on top of each other and to clamp them together to form a single whole by means of heavy bolts and nuts. A construction of this kind, sometimes called a filterpress stack, is described for example in U.S. Pat. No. 3,099,587. With such a construction it is very difficult to remove a defective cell because the entire battery has then to be dismantled. In addition, such constructions have the characteristic that fairly powerful parasitic currents can occur when a liquid electrolyte is used. These currents are caused by the fact that electrical contact can be made through the electrolyte between the electrodes at different potentials in different fuel-cells, with the consequence that high fuel consumption occurs, while the voltage delivered by the cell may be considerably smaller than is theoretically possible. The result of the latter is that for a given power more powerful currents will occur, so that the electrical measuring and control equipment has to satisfy exacting requirements.

SUMMARY OF THE INVENTION

It is an object of the invention to provide a battery unit containing one or more fuel-cell blocks and in which the disadvantages mentioned hereinbefore are mitigated.

In a battery unit according to the invention the fuel-cell block(s) containing one or more fuel-cells is (are) fastened to a beam in or on which there are primary ducts for the transport of fuel, oxidising agent and, if necessary, electrolyte. To these primary ducts secondary ducts are connected for the supply and removal of fuel, oxidising agent and, if necessary, electrolyte, which are joined to the duct means in the fuel-cell blocks. For reasons of strength the primary ducts will preferably be inside the beam.

In one preferred embodiment the beam has the form of an I-beam, with the fuel-cell blocks placed on either side of, and in contact with, the thin intermediate section, while the primary ducts are fitted in the broad top and/or bottom section(s) of the I-beam.

With such a battery unit it is a very simple matter to replace a defective block. It is only necessary to disconnect the gas and/or liquid connections with the block, after which the block can be detached from the beam. Flexible connections such as hoses are preferably used for these gas and liquid connections. It is however also possible to design the beam and the fuel-cell blocks in such a manner that the connections are effected simply by attaching the block to the beam.

It is likewise possible to use concave and convex clamps or flanges. The final choice mainly depends on the ease with which it is necessary to be able to undo the connection and on the required reliability of the connections with respect to leaks.

It is preferable to fit the connections between, on the one hand, the primary ducts for transporting gas, etc. located in or on the central beam, and the ducts in the fuel-cell blocks, with shut-off valves so that a defective block can be replaced without any necessity to remove any liquid which may be in the battery unit.

The construction in accordance with the invention necessitates only a few connectors, which is a considerable advantage.

If a liquid electrolyte is used, such as for example a caustic alkali solution, a number of problems have to be overcome in determining the dimensions of the connections between the beam and the blocks. To ensure, for instance, that the efficiency of the unit is not markedly reduced as a result of parasitic currents, it is preferable that the resistance in the ducts between the various fuel-cell blocks should be as large as possible. On the other hand, the distribution of the liquid over the various fuel-cell blocks is required to be as uniform as possible. These in some respects conflicting requirements are reasonably satisfied if the following equations are satisfied $$\frac{d^2}{\lambda} \leq \frac{4\rho}{50\pi} \text{ and } \frac{d^2}{\lambda} \leq \frac{0.6 D^4}{N^2 L d^2}$$

where:

$d$ = diameter of the secondary ducts for supplying electrolyte to and removing it from the fuel-cell blocks, in cm;

$\lambda$ = length of the secondary ducts for supplying electrolyte to and removing it from the fuel-cell block, in cm;

$D$ = diameter of the supply and removal primary ducts for electrolyte in or on the central beam, in cm;

$L$ = length of the supply and removal primary ducts for electrolyte in or on the central beam between two branches, in cm;

$N$ = number of fuel-cell blocks fastened to the central beam;

$\rho$ = resistivity of electrolyte, in ohms.cm.

Optimum conditions are obtained if following equation is approximately satisfied $$\frac{d^2}{\lambda} = \frac{4\rho}{R_{el}\pi} = \frac{0.6 D^4}{N^2 \cdot L \cdot d^2}$$

where $R_{el}$ is the electrical resistance in the secondary electrolyte duct between the electrolyte primary duct and the block (in ohms).

These formulae mean in practice that relatively long but not excessively thin lines between the beam and the fuel-cell blocks are to be preferred.

In the event that there are 12 blocks connected in series, each of 6 V, which are placed with their backs to an I-beam, and the electrolyte consists of a 30% solution of caustic alkali in water (1 = approx. 1 ohm.cm), a secondary duct of at least 30 cm length and 4 mm internal diameter will do much to prevent parasitic currents, without any need to overcome great problems with regard to pumping energy.

If two or more battery units are included in a fuel-cell battery, it is of advantage to make the main electrolyte ducts in the units and those between the units also relatively long, but not too thin.

If it is desired to use a fuel-cell battery constructed from a number of units, as described herein, as an energy source for vehicles and the like, the beam together with the fuel-cell block(s) and auxiliary equipment, if any, will preferably be housed in a preferably closed casing provided with the necessary passages for the external connections for fuel, oxidising agent, if necessary electrolyte, and collection of current.

Safety equipment can also to advantage be housed in such a casing.

The constructional problems referred to in the introduction in connection with the pressure resistance of the fuel-cells and the battery are to a large extent overcome in the battery unit according to the invention. The pressure build-up across a fuel-cell block is much less than that across the filter-press stack, which contains far more cells. It is therefore possible to use much thinner end plates. The casing also acts as stiffening.

Moreover, it is possible to reduce these constructional problems still further by using as end plates (or part of them) of the fuel-cell blocks metal plates which also act as current collectors. Additionally, by placing the fuel-cell blocks on both sides of the beam, the constructional problems are avoided for one side of the blocks, since the pressure increases can be absorbed by the central beam and possibly also by the block on the other side. By their positioning these blocks also contribute to the strength of the beam, so that the latter can be made lighter. If necessary, it is also possible to incorporate reinforcement in the beam.

If the strength of the beam is of less concern than, for example, the amount of sag, it is preferably not to place the fuel-cell blocks back to back but to stagger the row of blocks on one side of the beam by half the length of a block in relation to the row on the other side.

If an I-beam with fuel-cell blocks on both sides is used which is housed in a closing casing, the latter can be so strongly constructed as to be used to absorb the pressure increase in the blocks.

With regard to the flow pattern, it is best to choose the so-called D form. This means that the directions of flow of the intake and outlet are opposite in the I-beam. The inlet and outlet connections are then fitted at the same extremity of the I-beam. In this respect it differs from the S form in which the direction of flow is the same for intake and outlet and in which the intake and outlet connections are fitted at different extremities of the I-beam.

The D form for the flow pattern has a distinct advantage. With this pattern, when the entire battery unit is replaced, connections have to be undone and remade at only one end, so that the entire battery unit is easier to replace. The choice of low pattern is, however, dependent on the distribution problems occurring over the blocks.

The I-beam preferably made completely symmetrical and can be made of various materials. The choice of material for the beam depends on the temperature at which the fuel-cells work. Thermosetting resins such as epoxy resins, which may if desired incorporate fillers or reinforcement such as glass fibres, are very suitable. It is also possible to use reinforced or non-reinforced foamed synthetic resins in order to reduce the weight. Holes may also be cut out in the thin part of the beam, so that weight reduction is achieved without serious loss of strength.

It is possible to cast the beam in one piece in a mould in which the bundles of pipes for the transport of fuel, etc., and the inlets to and outlets from the blocks are best fitted in advance.

Another solution is to construct the I-beam of two symmetrical halves in which space has been left for the transport of gas and liquid.

The invention is not restricted to the embodiments illustrated here.

DETAILED DESCRIPTION OF THE DRAWINGS

Figure 1:
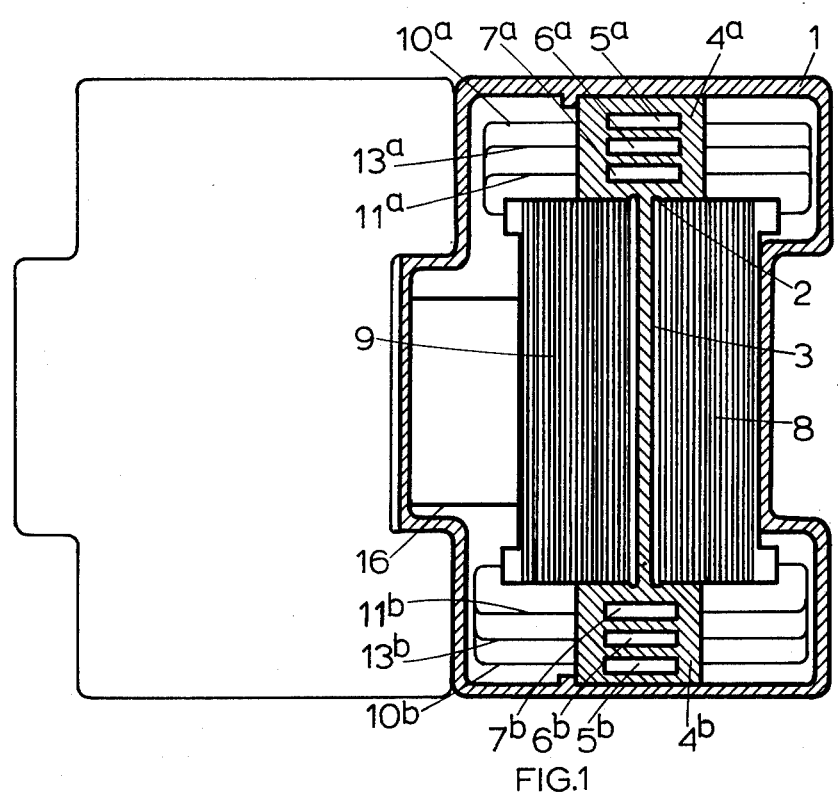
FIG. 1 is a schematic cross-section through one preferred embodiment of the battery unit according to the invention.

FIG. 1 shows a casing 1 in which is accommodated an I-beam 2. This beam consists of a narrow intermediate piece 3 and wide top and bottom pieces 4a and 4b. Incorporated in these pieces 4a and 4b are a total of six primary ducts 5a, 5b, 6a, 6b, 7a and 7b, for the transport of the necessary gases and/or liquid. Electrolyte, for example, is led in via duct 5b and led out via 5a. Fuel can then be led in via 6a and oxidising agent via 7a, which are then led out respectively via 6b and 7b. These substances are subsequently led to and from fuel-cell block 8 and 9 via pipes 10a and 10b, 11a and 11b, 13a and 13b, 14a and 14b, and 15a and 15b, pipes 10a, 10b, 15a and 15b being considerably longer than is necessary for optimum transport of liquid.

As can be seen clearly from FIG. 1, any increase of pressure in the fuel-cell blocks can easily be taken up by the wall of beam 1 together with the thin intermediate piece 3 of I-beam 2. If a safety device 16 or other auxiliary device is used, it can be dimensioned so that it, too, can help to absorb any increase of pressure.

Figure 2:
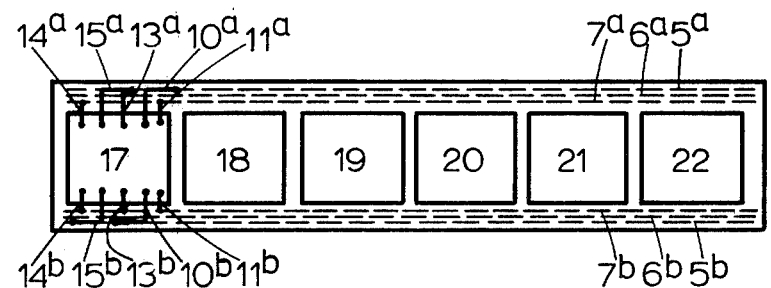
FIG. 2 is a simplified longitudinal schematic cross-section on a more reduced scale of this embodiment.

The simplified longitudinal section of a battery shown in FIG. 2 shows the side of I-beam 2 and fuel-cell blocks 17–22 placed against it. Ducts 5a to 7b are incorporated in the wide top and bottom pieces 4a and 4b of the I-beam. The D form of the flow pattern has been opted for here.

So far as is necessary, cavities can be reserved in or near the beam for electrical connections.

It has been assumed for the purpose of the drawing that the connections between the beam and the fuel-cell block are fastened at the side of the block. The unit can, of course, also be so designed that the connections are fixed to the top and bottom of the block.

The waste heat is removed from the cells with the circulating air so that no expensive heat exchangers need be employed. The air circulation also increases the safety because any hydrogen that may have escaped is quickly removed.

Figure 3:
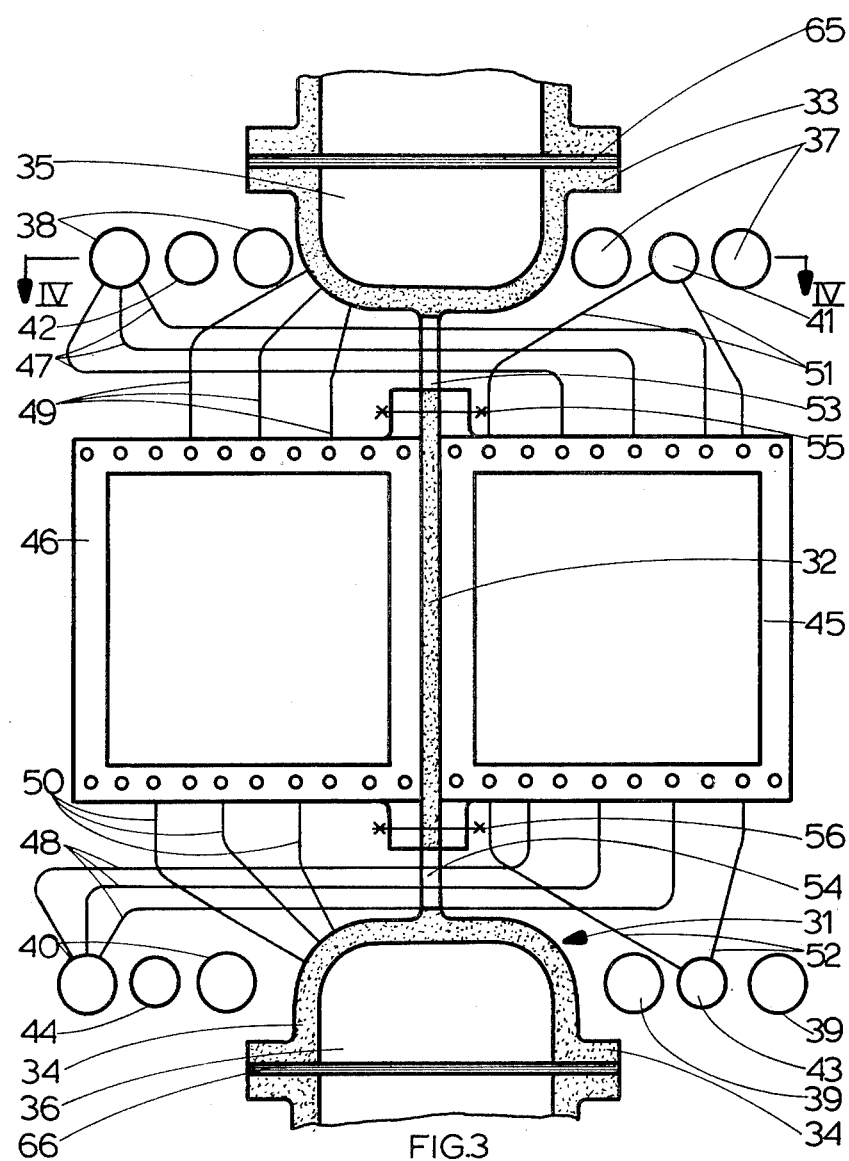
FIG. 3 is a schematic vertical cross-section through another preferred embodiment of the battery unit according to the invention.

In the embodiment shown in FIG. 3, 31 is an I-beam having a narrow intermediate part 32 and wide top and bottom parts 33 and 34, accommodating respectively a primary air supply duct 35 and a primary air discharge duct 36, which are closed at the top respectively bottom by flat plates 65 and 66. Electrolyte is supplied through primary supply pipes 39 and 40, and discharged through primary discharge pipes 37 and 38. Fuel gas is supplied through primary supply pipes 41 and 42 and discharged through primary discharge pipes 43 and 44.

Fuel-cell block, 45 and 46 are clamped to the narrow intermediate part 32 of the beam 31 by means of clamps 55 and 56. Air is supplied to the blocks by secondary tubes 49 connected to the mainduct 35, and discharged from the blocks by secondary tubes 50 connected to the mainduct 36. Likewise, fuel gas is supplied to the blocks by secondary tubes 51 and discharged by secondary tubes 52 connected to the primary pipes 41–44. To lengthen the electrical current path by way of the secondary electrolyte supply and discharge tubes 47 and 48, these tubes connect the blocks to the primary electrolyte pipes on the opposite side of the I-beam, openings 53 and 54 being provided in the narrow part 32 of the beam 31 for the passage of the secondary electrolyte tubes. In the drawing only part of the secondary tubes has been represented in the interest of clearness.

Figure 4:
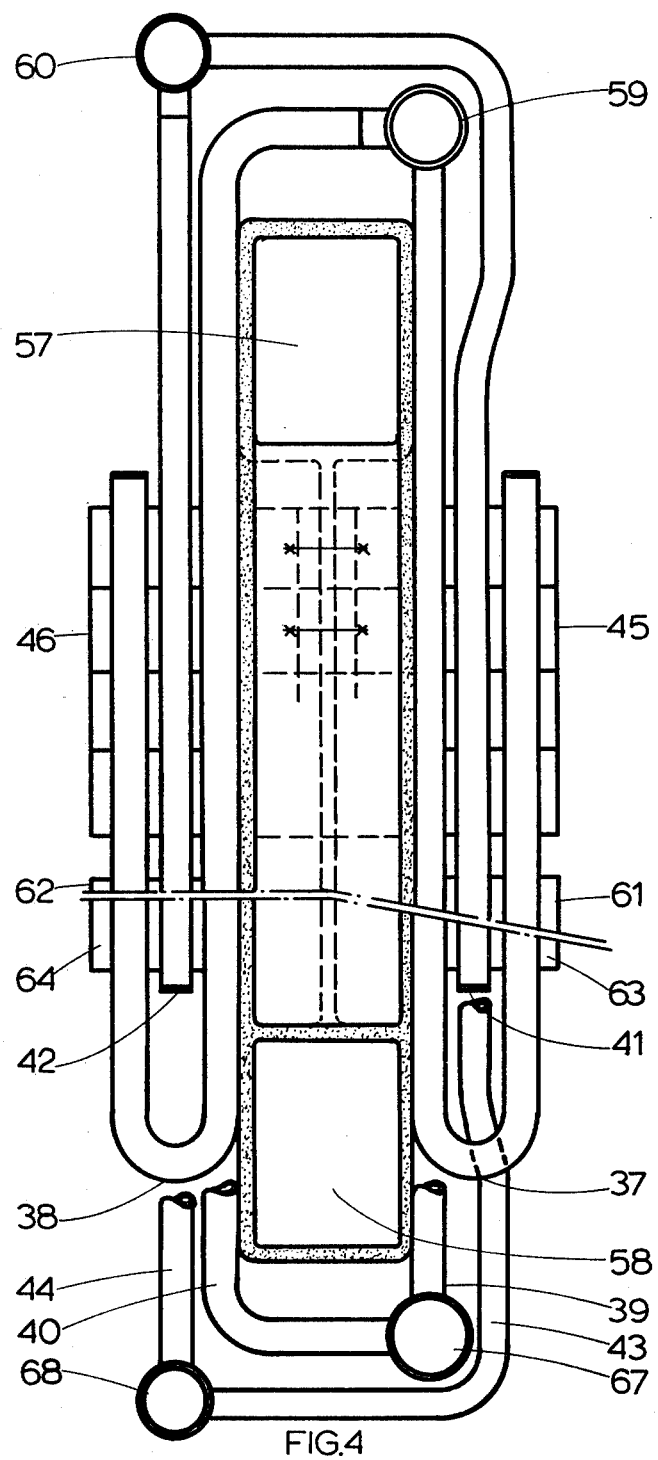
FIG. 4 is a schematic horizontal section along IV—IV in FIG. 3, on a slightly more reduced scale.

As indicated in FIG. 3, a number of battery units according to this embodiment of the invention can be stacked to form a larger battery section or a complete battery. As shown in FIG. 4, the ends of the beam are formed to provide a main air supply duct 57 in the stack of beams, which connects with the primary air supply duct 35 in each beam, and, likewise, to provide a main air discharge duct 58 connecting with the primary air discharge duct 36 in each beam.

Each primary fuel supply pipe 41 or 42 is connected to a vertical main fuel supply line 60; the fuel discharge pipes 43 and 44 are connected to a main fuel discharge line 68.

The primary electrolyte supply pipes 39 and 40 are connected to a main electrolyte supply line 67; the electrolyte discharge pipes 37 and 38 to a main electrolyte discharge line 59. As shown in FIG. 4, the length of the electrolyte pipes 37–40 (and thus the corresponding electrical current path) is increased by giving these pipes the form of an elongate loop alongside the beam; the secondary electrolyte tubes are connected to that section of the loop that is farthest from the main line 59 or 67. In addition to the fuel-cell blocks 45 and 46, similar blocks 61, 62, 63, 64 are partly visible in FIG. 4.

In contrast to the embodiment of FIGS. 1 and 2 the fuel-cell blocks are not placed "back-to-back" but "side-by-side" opposite each other on either side of the I-beam, i.e. the plane of the electrodes in the blocks is perpendicular to that of the narrow part 32 of the beam 31, instead of parallel to it as in the embodiment of FIG. 1 and 2.

The embodiment shown in FIGS. 3 and 4 is a preferred one for large stationary batteries. For such an application, pressure build-up in the separate blocks is a less important problem, as weight is not a main consideration and the blocks can be strong enough and pressure resistant in themselves.

In a practical design, the battery unit as represented in FIGS. 3 and 4 was 3 m long, 0.75 m high and 0.70 m wide, with six fuel-cell blocks mounted on each side (twelve in total). The units were stacked four-high, forming a battery section of 3 m long and 3 m high, and making 48 fuel-cell blocks in the stack or section. A number of such sections can be combined to form a fuel-cell battery. A large fuel-cell battery of this kind is useful for generating e.g. part of the electrical energy needed in a factory, particularly in a chemical plant in which a gas, such as hydrogen, is produced as a by-product, which is suitable for use as a fuel gas in the fuel-cell battery.

I claim:

1. A battery unit comprising a plurality of fuel-cell blocks, each containing one or more fuel-cells, in which blocks duct means are provided for the supply and removal of fuel and oxidizing agent to and from said fuel-cells, wherein the said battery unit further comprises an elongate beam against which the fuel-cell blocks are placed, primary ducts in or on said beam for the transport of fuel and oxidizing agent, and secondary ducts connected to said primary ducts for the supply and removal of fuel and oxidizing agent, which secondary ducts are joined to the duct means in the fuel-cell blocks.

2. A battery unit according to claim 1 wherein said blocks are additionally provided with duct means for the supply and removal of electrolyte to and from said fuel-cells, and wherein additional such primary ducts are provided for the transport of electrolyte, and additional such secondary ducts are provided for this supply and removal of electrolyte.

3. A battery unit according to claims 1 or 2, wherein the beam has the form of an I-beam, the fuel-cell blocks being placed on both sides against the thin intermediate section of the said I-beam.

4. A battery unit according to claim 3, wherein the said primary ducts are fitted in the wide top and/or bottom section of the said I-beam.

5. A battery unit according to claim 3, wherein the primary ducts for the transport of oxidising agent are fitted in the wide top and/or bottom section of the said I-beam.

6. A battery unit according to claims 1 or 2, wherein the said secondary ducts are flexible tubes.

7. A battery unit according to claim 6, wherein said flexible tubes are hoses.

8. A battery unit according to claims 1 or 2, wherein the following equations are satisfied:

$$\frac{d^2}{\lambda} \leq \frac{4\rho}{50\pi} \text{ and } \frac{d^2}{\lambda} \leq \frac{0.6\, D^4}{N^2 \cdot L \cdot d^2}$$

where:

d = diameter of the secondary ducts for electrolyte leading to and from the fuel-cell block, in cm;

λ = length of secondary ducts for electrolyte leading to and from the fuel-cell block, in cm;

D = diameter of the primary ducts for the intake and outlet of electrolyte, in cm;

L = distance along the primary ducts for intake and outlet of electrolyte between two subsequent connections to secondary ducts for electrolyte;

N = number of fuel-cell blocks fastened to the central beam;

ρ = resistivity of electrolyte, in ohms.cm.

9. A battery unit according to claim 8, wherein the following equation is approximately satisfied:

$$\frac{d^2}{\lambda} = \frac{4\rho}{R_{el}\pi} = \frac{0.6 D^4}{N^2 \cdot L \cdot d^2},$$

where $R_{el}$ = the electrical resistance in a secondary electrolyte duct (on ohms).

10. A battery unit according to claims 1 or 2, wherein the intake and outlet connections of the primary ducts are located at the same extremity of the beam.

11. A battery unit according to claim 3, wherein the fuel-cell blocks are placed back-to-back opposite each other on either side of the I-beam.

12. A battery unit according to claim 3, wherein the fuel-cell blocks are staggered by half a block in relation to each other on either side of the beam.

13. A battery unit according to claims 1 or 2, wherein the beam is accommodated together with the fuel-cell block(s) in a casing which is provided with the necessary passages for fuel, oxidising agent and, if necessary, electrolyte and current collection.

14. A battery unit according to claim 13, wherein safety equipment is also accommodated in the casing.

15. A fuel-cell battery wherein one or more battery units as claimed in claims 1 or 2 is incorporated.

16. In a fuel-cell battery unit comprising a plurality of fuel-cell blocks the combination of the following component parts:
- an elongate beam of generally I-shaped cross-section having relatively wide top and bottom parts and a relatively narrow intermediate part joining said top and bottom parts;
- a plurality of fuel-cell blocks attached removably on both sides against the said narrow intermediate part of the said beam;
- primary air channels for the supply and/or discharge of air in the said wide top and bottom parts of the beam;
- primary pipes for the supply and/or discharge of fuel gas and electrolyte along both sides of said wide top and bottom parts, and
- secondary tubes for the supply and/or discharge of air, electrolyte and fuel gas connecting the said primary pipes and channels with the fuel cell blocks.

17. A fuel-cell battery unit according to claim 16, wherein the said wide top and bottom parts are formed to provide air channels in the form of ducts open on their upper, respectively lower side and flat plates are provided to close the open sides of said ducts.

18. A fuel-cell battery unit according to claim 16 wherein the secondary electrolyte supply- and discharge tubes connect fuel-cell blocks with primary electrolyte pipes on opposite sides of the beam.

19. A fuel-cell battery unit according to claim 16 wherein the primary electrolyte supply- and discharge ducts have the form of an elongate loop alongside the beam, and the secondary electrolyte tubes are connected to that part of a loop that is farthest from the supply- or discharge end of the duct.

20. A fuel-cell battery or battery section comprising a plurality of battery units according to claim 14 stacked one on top of the other.

21. A fuel-cell battery unit according to claim 16 wherein in the ends of the beam duct sections are provided which can connect with similar duct sections in similar battery units when a plurality of such elements is stacked one on top of the other, to provide main air supply and discharge ducts.

* * * * *

UNITED STATES PATENT AND TRADEMARK OFFICE
CERTIFICATE OF CORRECTION

PATENT NO. : 4,176,213
DATED : November 27, 1979
INVENTOR(S) : Jacques van Linden It is certified that error appears in the above-identified patent and that said Letters Patent are hereby corrected as shown below:

In column 3, line 16, change "(1 = approx. 1 ohm.cm)" to read --($\rho$ = approx. 1 ohm.cm)--.

In column 4, line 9, change "low" to read --flow--.

In column 5, line 29, change "block" to read --blocks--.

In claim 20, column 8, line 37, change "claim 14" to read --claim 16--.

Signed and Sealed this

First Day of April 1980

[SEAL]

Attest:

SIDNEY A. DIAMOND

Attesting Officer

Commissioner of Patents and Trademarks